United States Patent

Cardinal, Jr.

[11] 3,947,350
[45] Mar. 30, 1976

[54] PROCESS OF PREPARING SEWAGE SLUDGE FOR DEWATERING

[75] Inventor: Paul J. Cardinal, Jr., Brisbane, Calif.

[73] Assignee: Envirotech Corporation, Menlo Park, Calif.

[22] Filed: July 19, 1974

[21] Appl. No.: 489,967

Related U.S. Application Data

[63] Continuation of Ser. No. 302,007, Oct. 30, 1972, abandoned, which is a continuation-in-part of Ser. No. 4,624, Jan. 21, 1970, abandoned.

[52] U.S. Cl. .................. 210/10; 210/18; 210/45; 210/47
[51] Int. Cl.$^2$.......................................... C02C 3/00
[58] Field of Search............................ 210/10, 3–8, 210/18, 45, 47, 61, 152, 66, 67, 15, 52, 53

[56] References Cited
UNITED STATES PATENTS

| | | | |
|---|---|---|---|
| 1,263,532 | 4/1918 | Cummings | 210/42 |
| 3,409,545 | 11/1968 | Albertson | 210/10 |
| 3,442,498 | 5/1969 | Davis | 210/10 |
| 3,546,111 | 12/1970 | Busch | 210/10 |

OTHER PUBLICATIONS

Mulbarger et al., "Line Clarification, Recovery, Reuse and Sludge Dewatering", Jour. W.P.C.F., Vol. 41, Dec. (1969), pp. 2070–2085.
Nelson; F. G., "Recalcination of Water Softening Sludge", Journal American Water Works Ass., Vol. 36, (1944), pp. 1178–1184.

Primary Examiner—Charles N. Hart
Assistant Examiner—Benoit Castel
Attorney, Agent, or Firm—Robert E. Krebs; Thomas S. MacDonald

[57] ABSTRACT

Process for preparing sludge for dewatering in a tertiary line precipitation treating system in which raw sewage has been dosed with calcium hydroxide to remove phosphates. A source of carbon dioxide is introduced into the treating system to convert calcium hydroxide salts and other salts to the more readily dewatered carbonate form, and to convert magnesium hydroxide salts to the bicarbonate form to facilitate removal of magnesium from the system. Carbon dioxide may be introduced in gaseous form, an available source of which is the exhaust gases from sludge incineration following dewatering thereof. Alternatively, sulfuric acid or hydrochloric acid or other suitable chemical reactant may be introduced into the system to neutralize the higher pH of the sludge. Conversion of the sludge to the carbonate form is effected in conjunction with the production of carbon dioxide during the neutralization reaction effected by the chemical reactants introduced into the system. Desirably, the carbon dioxide is utilized in the system in a molar ratio of approximately 1 to 1 with the calcium hydroxide dosed into the system.

6 Claims, 4 Drawing Figures

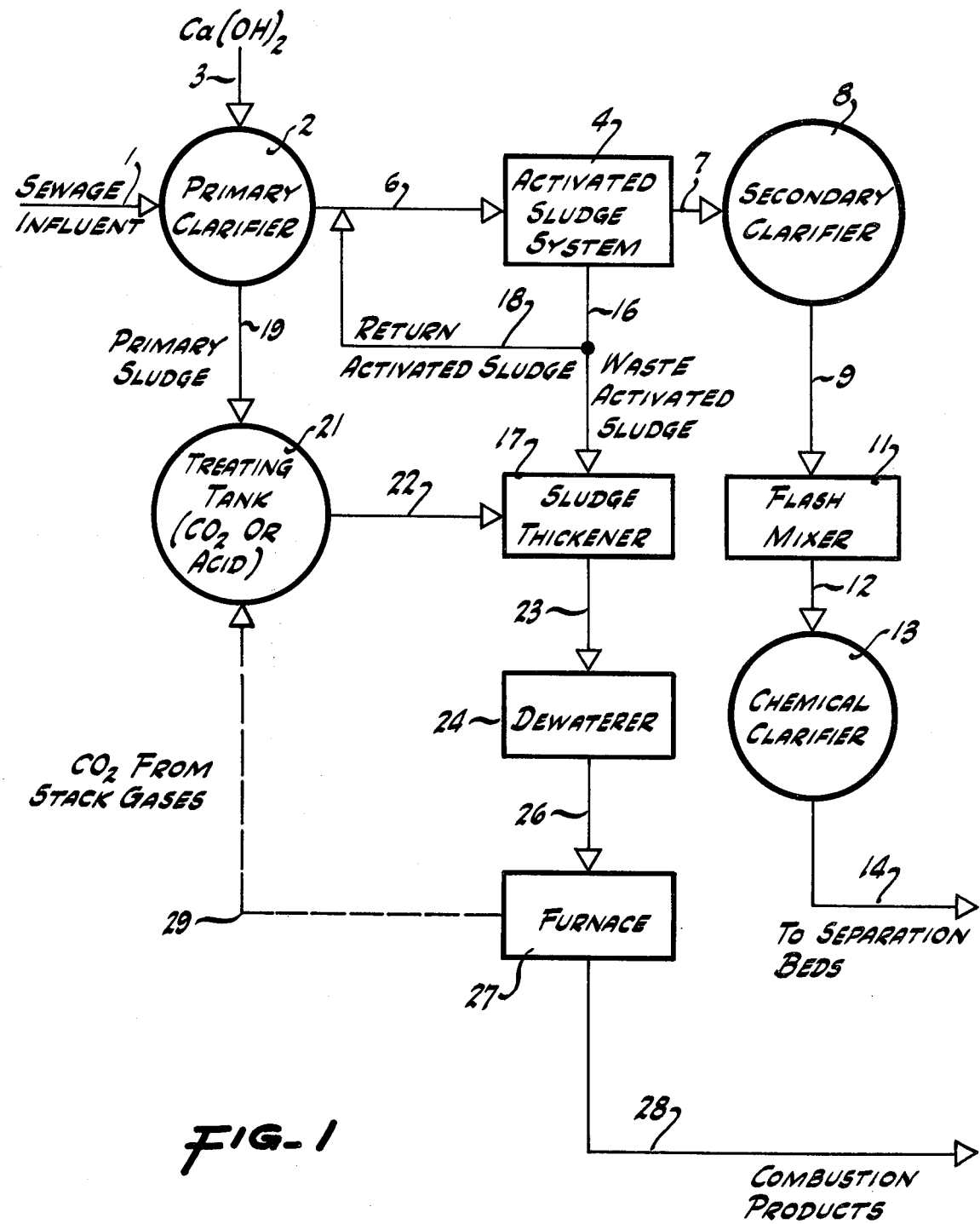

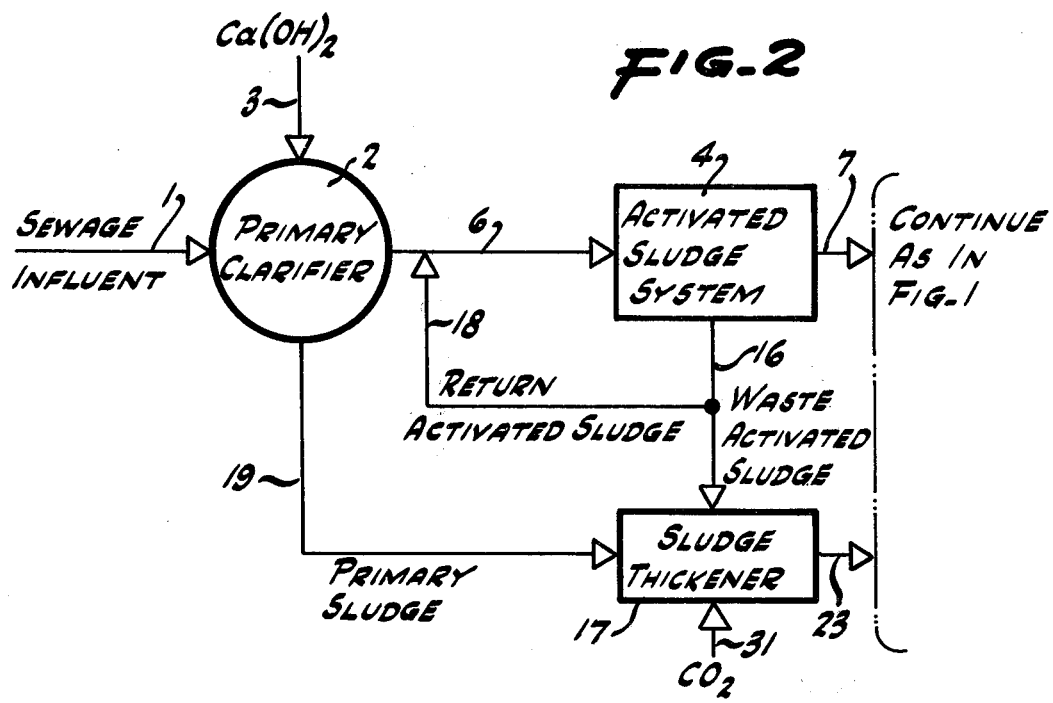
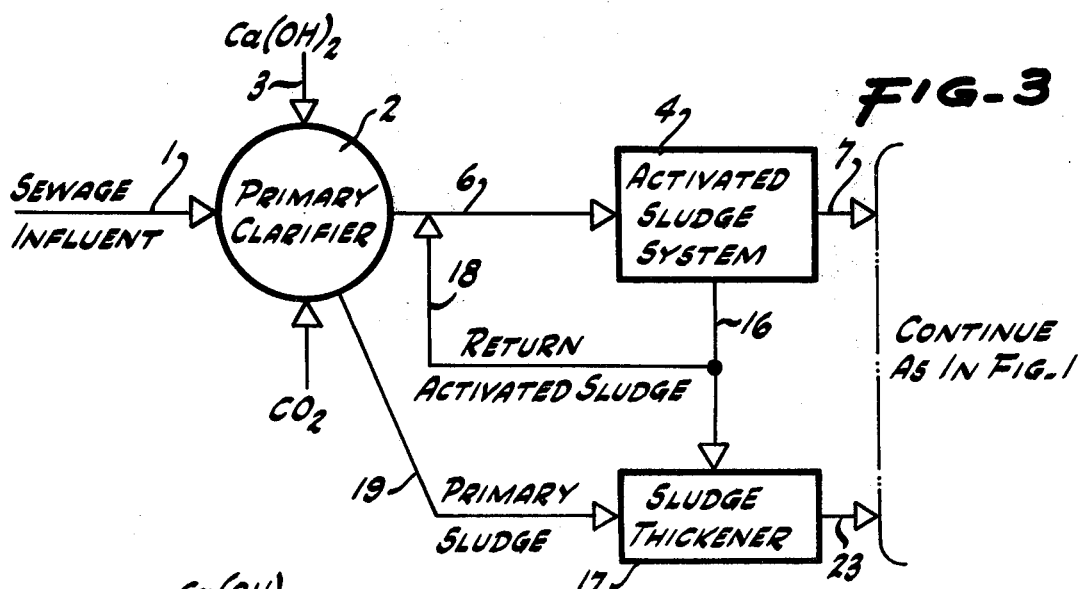
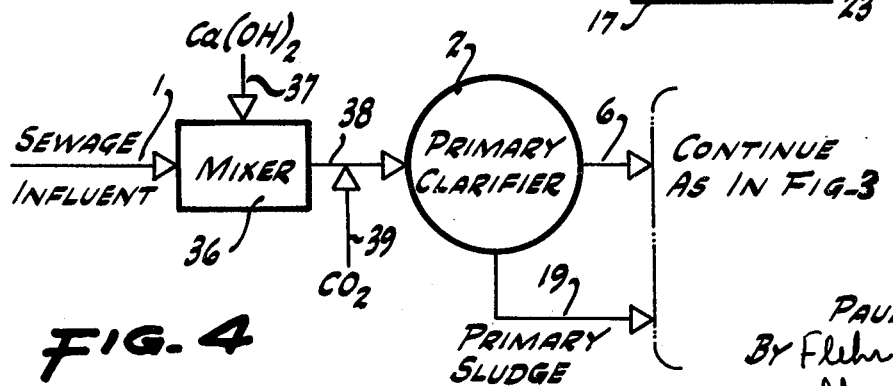

PROCESS OF PREPARING SEWAGE SLUDGE FOR DEWATERING

This is a continuation of application Ser. No. 302,007, filed Oct. 30, 1972; which is a continuation-in-part of application Ser. No. 4,624, filed Jan. 21, 1970; both now abandoned.

BACKGROUND OF THE INVENTION

1. Field of the Invention

This invention relates to the field of raw sewage treatment. More particularly this invention relates to the field of effective dewatering of sewage sludge by altering its chemical make up following phosphorous removal by lime precipitation in a tertiary sewage treating process. Still more particularly, this invention relates to the field of treating lime dosed sewage sludge with a source of carbon dioxide to facilitate subsequent dewatering thereof by converting the various calcium hydroxide salts and other salts to the carbonate form, and by converting magnesium hydroxide salts which may be present in the sewage to the bicarbonate form.

2. Description of the Prior Art

Tertiary sewage treating procedures and systems are well known and widely used, as is the procedure of dosing of raw sewage with calcium hydroxide to effect removal of phosphorous therefrom. Such dosing is effected in the primary clarifier of a tertiary system. Further phosphorous removal is commonly effected by dosing the activated sludge effluent from a secondary clarifier of such a system, also in known fashion. However, it has become apparent that sludge produced from dosing with lime in the manner described is extremely difficult to dewater, as a result of which subsequent incineration and disposal of the sludge is complicated and rendered difficult as well as expensive.

So far as is known, the procedure disclosed herein for effectively counteracting the difficulties encountered in dewatering sludge produced by dosing sewage at the primary or secondary stages has been unknown heretofore. That is, the improved procedure of introducing a source of carbon dioxide into a tertiary treating sewage system to recarbonate the lime and sewage sludge by transforming the calcium hydroxide and magnesium salts and other salts produced during dosing of the sewage to the carbonate or bicarbonate form has been unknown heretofore. When the salts are thus transformed, subsequent dewatering of the sludge is greatly simplified.

Introduction of carbon dioxide into a sewage treating procedure has been suggested generally in Cardinal and Sherwood U.S. Pat. No. 3,623,975, "Plural Purpose Sludge Incinerating and Treating Apparatus and Method", dated Nov. 30, 1971, assigned to Envirotech Systems, Inc. Also, Davis, U.S. Pat. 3,442,498 dated May 6, 1969 discloses generally the utilization of carbon dioxide in a sewage treatment system prior to formation of any calcium hydroxide in the system and without attendant phosphorous removal or conversion of magnesium hydroxide to the bicarbonate form. However, introduction of carbon dioxide into a lime precipitation tertiary treating procedure for the specific purpose of recarbonating hydroxide salts and other salts in the system to facilitate, simplify and insure effective dewatering of the sludge has not been suggested heretofore so far as is known.

SUMMARY OF THE INVENTION

This invention relates generally to an improved procedure for treating sludge obtained from a raw sewage lime precipitation treating system. More particularly, this invention relates to the recarbonation of calcium hydroxide and magnesium hydroxide salts and other salts to the carbonate or bicarbonate form following dosing of sewage sludge with calcium hydroxide in a tertiary treating system. Still more particularly, this invention relates to preparing sewage and lime sludge for dewatering by introducing a source of carbon dioxide into a raw sewage treating system subsequent to lime dosing to effect transformation of the hydroxide salts in the sludge to a carbonate form in which form subsequent dewatering and ultimate disposal of the sludge is greatly facilitated.

Still more particularly, this invention relates to the introduction of carbon dioxide from a suitable source, prior to or subsequent to primary clarification of raw sewage being dosed. If gaseous carbon dioxide is introduced into the system, one suitable source thereof is the gaseous products of combustion obtained when dewatered sludge is burned in a suitable furnace, such as an incinerator or a lime recalcining kiln, thereby utilizing a readily available and inexpensive source of carbon dioxide. In another embodiment, a chemical reactant which produces or liberates carbon dioxide may be introduced into the system, such as a suitable acid or the like.

From the foregoing, it will be understood that objects of this invention include the provision of an improved process of removing phosphorous and treating sewage sludge obtained from a lime precipitation raw sewage tertiary treating system; the provision of an improved process of preparing sewage sludge to facilitate subsequent dewatering thereof; the provision in a sewage sludge treating process which utilizes carbon dioxide to effect recarbonation of the calcium hydroxide salts, magnesium hydroxide salts, and other salts, produced in the system following dosing of raw sewage with calcium hydroxide; and the provision of an improved process for selectively introducing carbon dioxide into a lime dosed sewage treating process following such dosing to transform salts therein to the carbonate or bicarbonate form to facilitate dewatering of the sludge and subsequent incineration or recalcination and disposal thereof.

These and other objects of this invention will become apparent from a study of the following disclosure in which reference is directed to the accompanying drawings.

DESCRIPTION OF THE DRAWINGS

FIG. 1 is a schematic flow sheet diagram illustrating the sludge treating process of the present invention in conjunction with a tertiary treating sewage system.

FIGS. 2, 3 and 4 are schematic views corresponding generally to FIG. 1 illustrating modifications to the treating procedure of FIG. 1.

DESCRIPTION OF THE PREFERRED EMBODIMENTS

Removing phosphorous in the phosphate or other form from raw sewage is a major consideration in sewage treating plants and systems of the lime dosed tertiary treatment type. Commonly, sewage influent to a treating system is dosed with calcium hydroxide in conjunction with primary clarification thereof to effect phosphorous removal. Additionally, under certain circumstances, further phosphorous removal is achieved by dosing effluent discharged from the primary clarifier with further quantities of calcium hydroxide, or other products such as polymer and alum. However, with such known dosing procedures, it has been found that the sludge removed from a clarifier which has been dosed with calcium hydroxide generally is extremely difficult to dewater, thereby making disposal by incineration, recalcination and other means extremely difficult and expensive. Such dewatering difficulties are encountered because of the chemical characteristics of the dosed sludge, the high moisture content thereof, and additionally because mechanical handling problems are encountered in dewatering devices, such as centrifuges and the like. Such dewatering problems of the sludge in the generally encountered pH range of 8.0 to approximately 11.0 have become pronounced to the point that it is difficult to operate a tertiary treatment plant in which calcium hydroxide dosing is employed in the simplified manner originally planned therefore.

An important feature of this invention resides in the effective treatment of lime sludge and sewage sludge produced in a lime dosed raw sewage tertiary treating system to facilitate phosphorous removal and dewatering thereof following clarification. Such treatment involves selectively introducing carbon dioxide into the treating system to effect recarbonation of the calcium and magnesium hydroxide salts and other salts resulting from dosing of the sewage influent. Transformation of the salts to the carbonate or bicarbonate form produces a sludge which is easier to dewater than one in the hydroxide form because of the different specific gravities and chemical characteristics of the sludge products. Carbonate materials have a higher specific gravity than hydroxide materials and, therefore, settle more easily in thickening and dewatering operations.

Furthermore, the characteristics of salts in the carbonate or bicarbonate form are such that they do not retain water on their surfaces to the extent which is characteristic of hydroxide salts nor is water bound within the molecular structure of the carbonate or bicarbonate form as is true of the hydroxide form. Thus, with the present invention the selective reintroduction of carbon dioxide into the treating system at preselected locations following lime dosing produces a recarbonated sludge which may be more readily thickened and dewatered prior to incineration, recalcination or subsequent disposal thereof.

Referring to FIG. 1, a system utilizing the improved treating process of this invention is shown. Such process is illustrated in conjunction with a standard raw sewage lime precipitation tertiary treating procedure with the improved concepts of this invention incorporated thereinto. In such a procedure, raw sewage influent is introduced through conduit 1 into a primary clarifier 2 for clarification therein in known fashion. A predetermined quantity of calcium hydroxide is introduced through conduit 3 into the primary clarifier for phosphorous removal from the sewage in the primary clarifier in known fashion.

After primary clarification, the clarified mixture is subjected to a secondary treatment in an activated sludge system, summarized by reference numeral 4, in which aeration or like treatment of the sludge is effected. Sludge from primary clarifier 2 is introduced through conduit 6 in the activated sludge system 4.

The sewage effluent from the activated sludge system passes through conduit 7 into a secondary clarifier 8. Following secondary clarification, in known fashion, the effluent passes through conduit 9 into a flash mixer 11 from which the effluent passes through conduit 12 into a chemical clarifier 13. From the chemical clarifier a suitable conduit 14 carries the clarified sewage to subsequent treatment, in separation beds and the like. Procedures effected within the activated sludge system 4, secondary clarifier 8, flash mixer 11, and chemical clarifier 13 are conventional and well known in the tertiary treating art.

Waste activated sludge from the sludge system 4 is transferred through conduit 16 into a sludge thickener 17 of known construction. In known fashion, a predetermined portion of the activated sludge is returned through conduit 18 into the tertiary system in advance of the activated sludge system 4 for retreatment therein for most effective results.

Sludge from primary clarifier 2 in the embodiment illustrated is transferred through conduit 19 into a treating tank 21 in which the primary sludge is subjected to the recarbonation effects of carbon dioxide which transforms the hydroxide salts and other salts in the sludge to the carbonate or bicarbonate form, in which form they may more readily be dewatered as will be described.

Following carbon dioxide treatment in tank 21, the recarbonated sludge is introduced through conduit 22 into the aforementioned sludge thickener 17 in which settling is allowed to take place. The fluid overflow from thickener 17 passes from the thickener in known fashion and the solids are transferred through conduit 23 into a dewatering apparatus 24. Such dewaterer may be of any type well known and used in tertiary systems, such as a centrifuge, vacuum filter or the like. The dewatered sludge thereafter preferably is transferred through conduit 26 into a furnace apparatus 27, which may be of any known type, such as a multiple hearth incinerator, a lime recalcining kiln, or a combination incinerator-kiln, as described in said aforementioned Cardinal and Sherwood U.S. Pat. No. 3,623,975. The dried solid products of combustion are removed from the furnace through suitable conduit means 28 for subsequent treatment and handling in known fashion.

In one embodiment of this invention the gaseous products of combustion of furnace 27 are utilized as a readily available and relatively inexpensive source of carbon dioxide which can be employed to recarbonate the sludge in the treating tank 21. Such exhaust gases resulting from incineration or recalcination of the sludge in furnace 27 are discharged from the furnace and preferably are passed through a gas scrubber (now shown) of known construction to cleanse and concentrate the carbon dioxide therein for subsequent reuse. As thus concentrated, the carbon dioxide may be selectively reintroduced through suitable conduit means 29 into the aforementioned treating tank 21. Such carbon dioxide gas thus bubbles through the mixture in tank 21 to produce the recarbonating results desired.

As an alternative to utilization of gaseous carbon dioxide from the stack gases of furnace 27, suitable chemical reactants or compositions which provide a source of carbon dioxide may be introduced into the treating tank 21 to effect transformation of the hydroxide salts therein to the carbonate or bicarbonate form. That is, by introducing a suitable chemical reactant or reactants into the system, the pH of the lime dosed sludge is reduced from its normal range of approximately 8.0 to 11.0 to approximately 7.0 pH, thereby converting the calcium compounds in the sludge to calcium carbonate and the magnesium compounds in the sludge to magnesium bicarbonate. Various known chemical reactants may be employed for that purpose, the criterion for their use being their ability to produce carbon dioxide when mixed with the salts contained in the sludge introduced into treating tank 21. In that connection, various acids known to be reactive with the sludge to produce or liberate carbon dioxide therefrom during the chemical reaction therebetween may be employed. Sulfuric acid and hydrochloric acid are typical and exemplary of the type of chemicals which may be employed to reduce the solubility of the hydroxide salts to convert the same to the carbonate or bicarbonate form.

With the arrangement shown in FIG. 1, carbon dioxide is introduced into contact with the lime dosed primary sludge following primary clarification thereof and prior to thickening of the sludge thus recarbonated. With the arrangement shown in FIG. 2 (in which similar reference numerals are employed to identify similar components of the system previously described with respect to FIG. 1), the source of carbon dioxide also is introduced into the system following primary clarification of the lime dosed sludge. However, a separate treating tank of the type employed at 21 in FIG. 1 is not employed in the FIG. 2 embodiment. Rather, the source of carbon dioxide is introduced through a suitable conduit 31 directly into the sludge thickener 17.

With the embodiments shown in FIG. 1 and FIG. 2, the carbon dioxide, whether introduced in gaseous form from the stack gases of furnace 27 or from some other suitable source of gaseous $CO_2$, or added as a chemical reactant which liberates gaseous carbon dioxide during reaction, the $CO_2$ bubbles through the sludge in tank 21 or thickener 17 to effect conversion of the salts to the carbonate or bicarbonate form as noted previously.

In that connection, it has been found that activated sludge from sludge system 4 normally need not be subjected to carbon dioxide bubbling. However, activated sludge also may be subjected to recarbonation if found desirable for convenience in a particular plant layout. In that regard, if carbon dioxide is bubbled into the thickener 17 or the sludge holding tank 21, activated sludge may be introduced into such thickener or tank on a batch basis by filling the same with primary sludge, recarbonating, adding activated sludge, and then dewatering the resulting mass. Following dewatering, the cycle may be restarted and completed again. Such a batch treating system is illustrated in the showing of FIG. 2.

With the system shown in FIG. 3, the treating tank 21 described previously also is eliminated and carbon dioxide is introduced in the manner described previously directly into the primary clarifier 2. In such an arrangement, recarbonation is effected directly in the clarifier prior to discharge of a recarbonated lime dosed primary sludge through conduit 19 into the sludge thickener 17 and subsequently into the dewaterer 24 in the manner described previously.

FIG. 4 shows a further alternate arrangement in which sewage influent passes through conduit 1 into a premixer tank 36 into which dosing calcium hydroxide is introduced through conduit 37 in advance of introduction of the treated effluent therefrom through conduit 38 into the primary clarifier 2. With this arrangement, the calcium hydroxide dosed sewage is treated with carbon dioxide as the same passes through the conduit 38 prior to its introduction into the clarifier. Carbon dioxide is introduced through conduit 39 into conduit 38 from a suitable source as described previously into operational contact with the calcium hydroxide treated sewage as it passes into the primary clarifier. Thus, sludge in the clarifier is converted to a carbonate form which permits settling in the clarifier of a sludge of the desired make up.

Following treatment in the primary clarifier, the recarbonated lime dosed primary sludge is discharged through conduit 19 to the thickener 17 and dewaterer 24 for subsequent treatment in the manner described previously.

The amount of carbon dioxide introduced into the various system embodiments described herein to react with the calcium hydroxide of the system will be selected in accordance with the requirements of particular treating installations. Generally, effective recarbonation requires approximately one mole of carbon dioxide for each mole of calcium hydroxide introduced into the system. That is, a molar ratio of approximately 1:1 $CO_2:CA(OH)_2$ has been found to produce effective results. However, in those systems in which magnesium hydroxide is formed in appreciable amounts, the molar ratio noted should be modified to increase the amount of carbon dioxide, for example to 1.5 or 2:1, to insure desired conversion of the magnesium hydroxide to magnesium bicarbonate.

By way of example, a tertiary sewage treating plant having 1 million gallons per day capacity, using 1 ton (240 ppm) of calcium hydroxide per day requires about 0.8 tons of carbon dioxide for complete and effective conversion of the calcium hydroxide salts to the calcium carbonate form. In such an arrangement the sludge constituency is altered so that the calcium hydroxide therein is converted to the carbonate form. The other materials in the sludge, such as primary solids and waste secondary sludge solids, remain essentially the same as in a conventional tertiary treating procedure. The introduction of carbon dioxide into the system subsequent to lime dosing produces the carbonic acid employed to produce recarbonation in the manner described.

It should be understood that the calcium hydroxide quantities dosed into the system to attain a minimum acceptable phosphorous removal level of approximately 70% is a direct function of the alkalinity of the sewage and its phosphorous content. Thus, alkalinity and phosphorous content should be carefully monitored in the system.

Therefore, it should also be understood that, for effective results, the raw sewage should be dosed with calcium hydroxide in amounts sufficient to insure that the pH of the sewage is increased to or maintained at 7.0 or above. In preferred operating systems, such pH is increased to within the range of approximately 8.5 to 12.0, to effect minimum acceptable phosphorous removal of approximately 70%.

However, if the pH level is controlled to fall within the range of 9.5 and above, magnesium hydroxide precipitation results. Such precipitation, unless counteracted, produces two undesirable results: (1) dewatering with mechanical devices is rendered more difficult, and (2) particulate buildup of magnesium hydroxide within the system increases. Thus to counteract such precipitation, carbon dioxide is utilized in the system to convert the magnesium hydroxide the magnesium bicarbonate, as noted, which is discharged from the system with other soluble effluents.

Having thus made a full disclosure of this invention in which an improved and simplified system for dewatering sludge from a lime dosed tertiary treating raw sewage process is described, reference is directed to the appended claims for the scope of protection to be afforded thereto.

I claim:

1. An improved process for treating sewage wastewater influent to a tertiary-type wastewater treatment system of the type that utilizes lime precipitation to remove phosphates from the wastewater comprising the steps of:
   a. dosing the sewage wastewater influent with sufficient calcium hydroxide to increase the pH of the sewage wastewater to at least 7.0 to precipitate at least 70% of the phosphates therefrom;
   b. clarifying said dosed sewage wastewater to produce a settled sludge containing the phosphate precipitates and calcium hydroxide solids and a clarified aqueous phase;
   c. carbonating the settled sludge by contacting the same with carbon dioxide to convert the calcium hydroxide solids to calcium carbonate in a molar ratio of approximately 1:1; and
   d. thereafter, without subsequent lime treatment, dewatering the carbonated sludge.

2. The process of claim 1 wherein the sludge is contacted with carbon dioxide by bubbling carbon-dioxide gas therethrough.

3. The process of claim 2 including the subsequent steps of incinerating the dewatered carbonated sludge in a separate zone, recovering gaseous carbon dioxide from the incineration products, and utilizing the recovered carbon dioxide to carbonate the settled sludge prior to dewatering.

4. The process of claim 3 in which the dewatering of the carbonated sludge is accomplished by a first thickening step comprising gravity settling to produce a thickened sludge and a second step comprising mechanically filtering liquids from solids in the thickened sludge.

5. The process of claim 1 wherein the dosing of the sewage wastewater with the calcium hydroxide is accomplished in a first settling zone and the carbon dioxide is introduced into the settled sludge in a separate second zone.

6. The process of claim 1 where the calcium hydroxide dosage is sufficient to increase the pH of the sewage wastewater to the range of 8.5 to 12.0.

* * * * *